US007042198B2

United States Patent
Mutoh

(10) Patent No.: US 7,042,198 B2
(45) Date of Patent: May 9, 2006

(54) SYSTEM USING A POWER CONVERTER

(75) Inventor: Nobuyoshi Mutoh, Tokyo (JP)

(73) Assignees: Keio University, Tokyo (JP); Japan Society for the Promotion of Science, Tokyo (JP)

( * ) Notice: Subject to any disclaimer, the term of this patent is extended or adjusted under 35 U.S.C. 154(b) by 396 days.

(21) Appl. No.: 10/226,249

(22) Filed: Aug. 23, 2002

(65) Prior Publication Data

US 2003/0161166 A1    Aug. 28, 2003

(30) Foreign Application Priority Data

Feb. 26, 2002    (JP) .......................... P2002-049934

(51) Int. Cl.
*G05F 1/70* (2006.01)

(52) U.S. Cl. .................. 323/205; 323/208; 363/50

(58) Field of Classification Search ............. 363/21.01, 363/39, 50, 52, 55; 323/205, 208; 361/42, 361/47, 58
See application file for complete search history.

(56) References Cited

U.S. PATENT DOCUMENTS 5,757,628 A * 5/1998 Kamata .................... 363/21.01

FOREIGN PATENT DOCUMENTS

| JP | 2-95215 A | 7/1990 |
|---|---|---|
| JP | 6-86538 A | 3/1994 |
| JP | 7-231669 | 8/1995 |
| JP | 9-37593 A | 2/1997 |
| JP | 9-284920 A | 10/1997 |
| JP | 10-313244 A | 11/1998 |
| JP | 2001-128467 | 5/2001 |
| JP | 2001-286156 | 10/2001 |

OTHER PUBLICATIONS

EPE2001-Graz, "New Methods to suppress EMI noises in the Motor drive system" by Nobuyoshi Mutoh, et al. (CD-ROM published in "9$^{th}$ European conference on power electronics and applications") (no date).

"Electromagnetic characteristics of a high density motor drive system using a printed power circuit board", by Nobuyoshi Mutoh, et al. (no date).

* cited by examiner

*Primary Examiner*—Jessica Han
(74) *Attorney, Agent, or Firm*—Sughrue Mion, PLLC

(57) ABSTRACT

EMI noise in a system using a power converter with switching control is reduced in a simple configuration.

The power converter 3 includes a converter 31, a smoothing capacitor 32, and an inverter 33, and receives the power from an AC power supply 1 via an AC reactor 2 and converts it into a power of an optional frequency and voltage to supply to a motor 4. Damping impedance elements 6, 7, 8 are inserted between the frame of the motor 4 and the ground 5, between the cooling fin 34 of the power converter 3 and the ground 5, and between the AC reactor 2 and the ground 5, respectively. Further, paths between the AC reactor 2 and ground 5, between the power converter 3 and ground 5, and between the motor 4 and ground 5 are insulated except that the damping impedance elements 6, 7, 8 are inserted.

27 Claims, 5 Drawing Sheets

R PHASE VOLTAGE

U PHASE VOLTAGE

FFT ANALYSIS OF
R PHASE VOLTAGE

FFT ANALYSIS OF
U PHASE VOLTAGE

R PHASE VOLTAGE (CONVERTER)

U PHASE VOLTAGE (INVERTER)

FIN CURRENT

CONVERTER SIDE

INVERTER SIDE

WITHOUT INSERTING IMPEDANCE

WITH INSERTING IMPEDANCE

SYSTEM USING A POWER CONVERTER

BACKGROUND OF THE INVENTION

The present invention relates to a system using a power converter with switching operation, for example, a system for driving a load such as a motor by output of the power converter.

Today, the power converter controlled with the switching operation is used in various devices such as a motor drive unit and required to have a robust and precise performance. To response the demand, switching characteristics of power elements forming the power converter has been improved and a considerably high switching speed of 10 to 100 nanoseconds is achieved. As a result, frequency of EMI (electromagnetic interference) noise generated from the system using the power converter becomes higher and thus the noise is enterable readily into other electronic or information devices via floating capacitance as a common mode noise, causing electromagnetic disturbance.

The common mode current (leak current) flowing within the motor drive system flows via the floating capacitance distributed variously in the system. To restrain such common mode current, it is essential to grasp the behavior of the common mode noise (voltage and current) in the drive system and establish a circuit model reflecting the behavior.

FIG. 8 is a view showing a schematic configuration of the motor drive system as an example of the system using the power converter with the switching operation. The motor drive system of FIG. 8 includes an AC power supply 1, AC reactor 2, power converter 3, and motor 4. The AC reactor 2, frame of the motor 4 (not shown), and the ground line of the power converter 3 (not shown) are connected to the ground 5. Herein, the frame means a structure supporting, the entire device covered by a conductor in electrically insulated condition from the electrified area of the device.

The power converter 3 receives the power supplied from the AC power supply 1 via the AC reactor 2 and converts it into a power of an optional frequency and voltage. The power converter 3 has a converter (rectifier) 31 for converting the input AC power to DC voltage, smoothing capacitor 32 for smoothing the output DC voltage of the converter 31, and inverter 33 for converting the smoothed DC voltage to AC voltage as basic components. The components are mounted on a circuit board 30 on which the converter 31 and inverter 33 are connected each other via DC main circuit conductors 300n, 300p formed on the circuit board 30. A cooling fin 34 is installed on an element housing framing the converter 31 and inverter 33. The cooling fin 34, restraining the temperature rise of the elements, is electrically connected to the ground line (not shown) of the circuit board 30.

There are two types of the EMI noise in such system. One is a normal mode noise generated by differential voltage from the DC main circuit conductors 300n, 300p between the converter 31 and inverter 33, the other is the common mode noise generated by the common mode current flowing through parasitic capacitance distributed in the motor drive system.

There are three types of the common mode current as shown in FIG. 8: current $I_{c2}$ leaking from the element housing of the power converter 3 to the ground via the cooling fin 34, current $I_{c3}$ leaking to the ground via the frame of the AC reactor 2, and current $I_{c1}$ leaking via the motor frame. Since the common mode current flows via the floating capacitance as shown in FIG. 8, high-frequency noise component flows as the leak current. In FIG. 8, symbols for the floating capacitance are omitted.

The normal mode noise can be restrained by inserting a noise filter in a DC line between the converter and inverter. For reducing the common mode noise, a method, employing a common mode transformer or active common mode chancellor between the inverter 33 and motor 4, has been proposed.

However, as it is expected that the frequency of the EMI noise, to which measures must be taken, will further increase, there is a possibility in the related art methods that a new current path inducing the common mode noise is formed through frames of an additional apparatus for the measures. Also, since those are the methods that restrain the noise by switching of the power elements in a condition that the apparatus for the measures is placed on a power transfer line between the inverter 33 and motor 4, there is a possibility of the new EMI noise generated by this switching operation. Also, the additional circuit for reducing the normal mode noise should be preferably avoided if possible.

SUMMARY OF THE INVENTION

The invention, achieved in view of the situation, intends to surely reduce the EMI noise in the system using the operational power converter with switching control in a simple configuration.

The system using the power converter with the switching operation of the invention has damping impedance elements inserted between one or a plurality of elements constituting the system and the ground, in which paths between the elements constituting the system and the ground are kept insulated except that the damping impedance elements are inserted. Since the invention requires only inserting the damping impedance element between the frame and ground to reduce the common mode noise, it is applicable easily even to the system after installed.

The damping impedance elements in the system of the invention are set to restrain resonance current flowing from a series resonance circuit having resonance spectra of which excitation source is voltage variation caused by the switching operation of the power converter.

The system of the invention further has the load driven by the power converter, in which the damping impedance element is inserted between the frame of the load and the ground.

The damping impedance elements in the system of the invention are set to restrain the resonance current flowing from the series resonance circuit having the resonance spectra of which excitation source is the voltage variation caused by the switching operation of the power converter and a resonance spectra of which excitation source is a micro-serge generated between the power converter and load.

The system of the invention further has the AC reactor connected between the input terminal of the power converter and an AC power supply, in which the damping impedance element is inserted between the frame of the AC reactor and the ground.

the damping impedance elements in the system of the invention are set to restrain the resonance current flowing from the series resonance circuit having the resonance spectra of which excitation source is the voltage variation caused by the switching operation of the power converter, and at least one of the resonance spectra of which excitation source is a micro-serge generated between the power converter and the load and a resonance spectra of which excitation source is a micro-serge generated between the power converter and AC reactor.

The system of the invention employs a resistor as the damping impedance element inserted. Since the additional element is the resistor, reduction of the common mode noise is achieved inexpensively.

The power converter in the system of the invention is formed using a multi-layer circuit board, in which a positive-side main-circuit DC conductor and negative-side main-circuit conductor of the power converter are arranged in a position where different wiring layers are substantially overlapped. In such arrangement, the normal mode noise is easily reduced, and thus the EMI noise is reduced efficiently.

A system for driving the load, having the power converter with the switching operation of the invention, employs the power converter formed using the multi-layer circuit board, in which the positive-side main-circuit DC conductor and negative-side main-circuit conductor of the power converter are arranged in the position where different wiring layers are substantially overlapped.

DETAILED DESCRIPTION OF THE PREFERRED EMBODIMENTS

Figure 1:
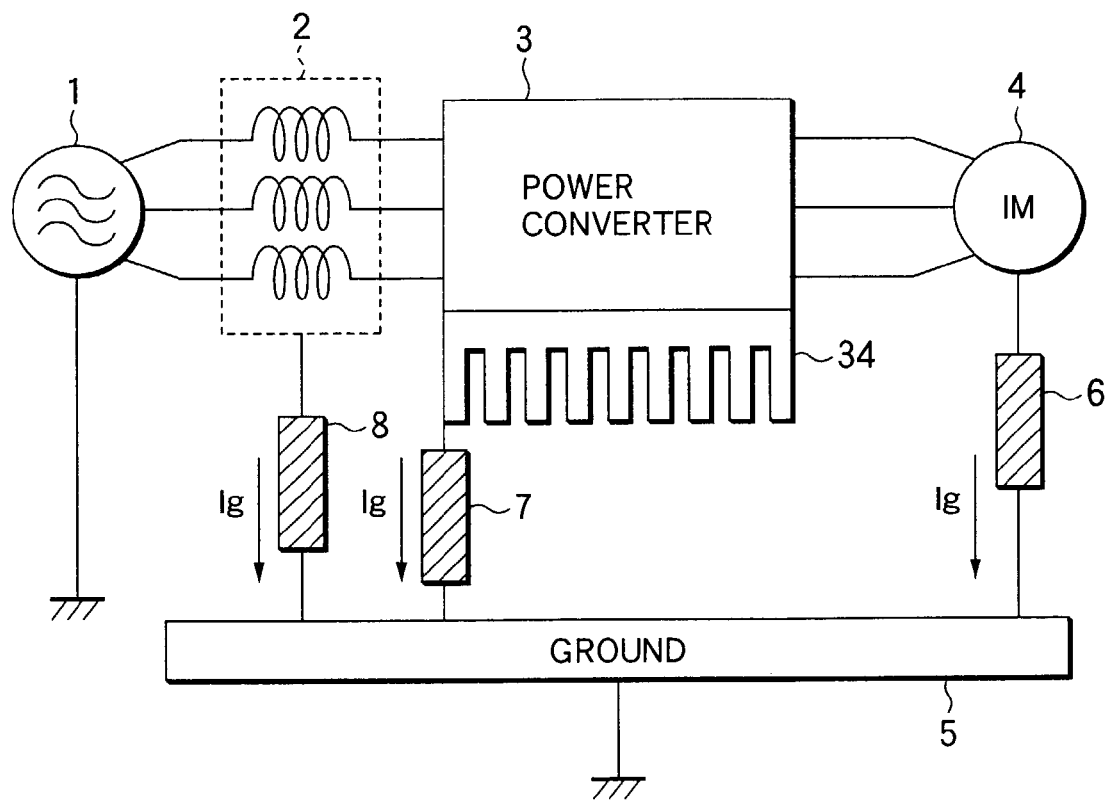
FIG. 1 is a view showing a schematic configuration of a system of an embodiment of the invention.

Hereinafter, preferred embodiments of the invention will be described using the drawings. FIG. 1 is a view showing the schematic configuration of the system of the embodiment of the invention. The system of FIG. 1 is the motor drive system using the power converter with the switching operation, in which the AC power supply 1, AC reactor 2, power converter 3, and motor 4 are same as in the system of FIG. 8. A different point from the system of FIG. 8 is that the damping impedance element 6 is inserted between the frame of the motor 4 and the ground 5, the damping impedance element 7 between the cooling fin 34 of the power converter 3 and the ground 5, and the damping impedance element 8 between the frame of the AC reactor 2 and the ground 5, and the paths between the AC reactor 2 and ground 5, between the power converter 3 and ground 5, and between the motor 4 and ground 5 are insulated except that the damping impedance elements 6, 7, and 8 are inserted respectively.

The damping impedance elements 6, 7, and 8 are set to restrain the resonance current flowing from the series resonance circuit having at least the resonance spectra of which excitation source is the voltage variation caused by the switching operation of the power converter 3. In addition, the damping impedance elements may be set to restrain the resonance current flowing from the series resonance circuit having at least one of the resonance spectra of which excitation source is the micro-surge generated between the power converter 3 and motor 4 and the resonance spectra of which excitation source is the micro-surge generated between the power converter 3 and AC reactor 2.

Next, the reason why the common mode current can be reduced by inserting such set impedance is described.

Figure 2A:
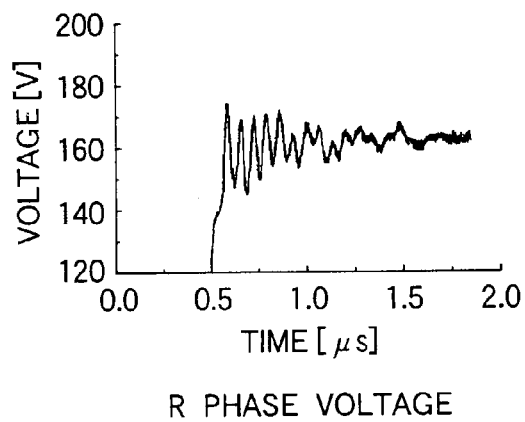
FIG. 2 is a view showing a transient waveform of phase voltage of the power converter during switching.
Figure 2B:
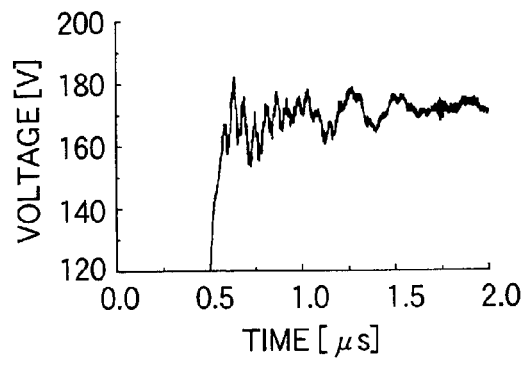
Figure 8:
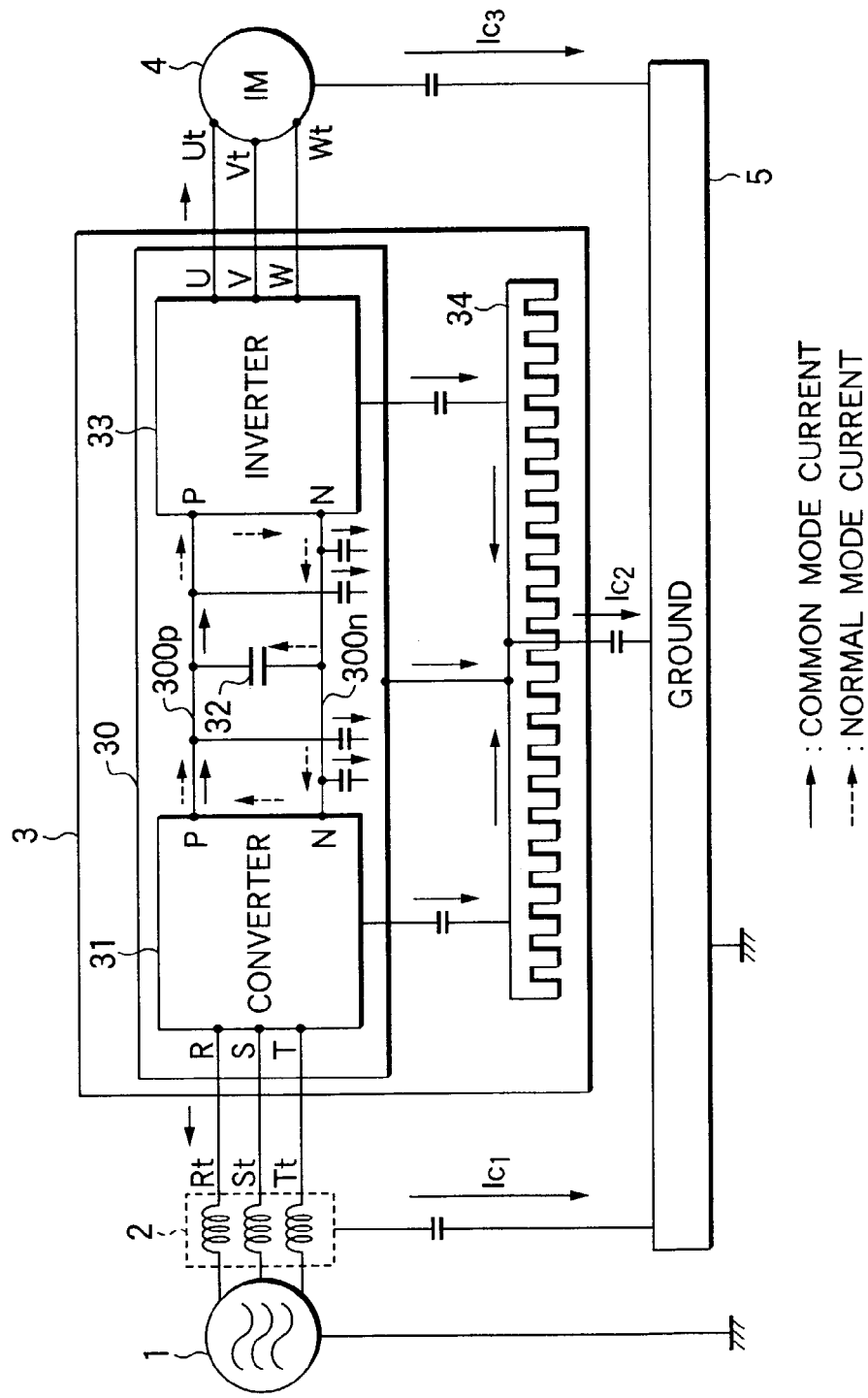
FIG. 8 is a view showing a schematic configuration of the motor drive system.

Examination results of high-frequency vibration generated by the voltage variation caused by the switching operation of the power converter 3 in FIG. 8 are illustrated. FIG. 2 is the view showing the transient waveform of phase voltage of the power converter during the switching. FIG. 2A shows a transient waveform of R phase voltage of the converter 31, while FIG. 2B shows the transient waveform of U phase voltage of the inverter 33. In each waveform, the high-frequency vibration is observed during the switching.

Figure 3A:
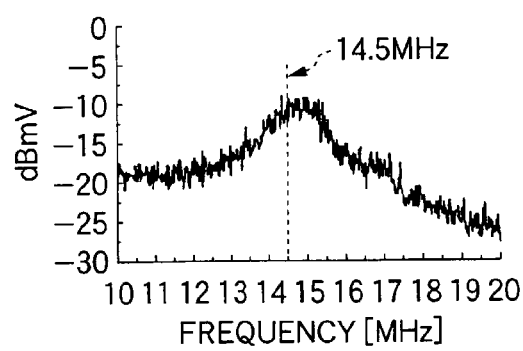
FIG. 3 is a view showing FFT analysis results of vibration component of the voltage in FIG. 2.
Figure 3B:
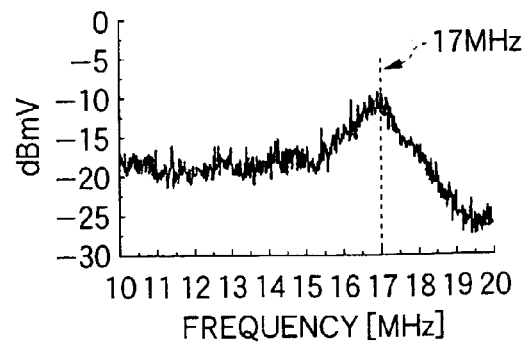

FIG. 3 shows FFT analysis results of the vibration component of the voltage in FIG. 2. FIG. 3A shows a analysis result of the waveform of FIG. 2A, while FIG. 3B shows an analysis result of the waveform of FIG. 2B. It is found from FIG. 3 that the EMI noise, having a resonance frequency of 14.5 MHz in the converter 31 or 17 MHz in the inverter 33, is generated from the power converter site and the frequency components are source of the EMI noise.

Figure 4A:
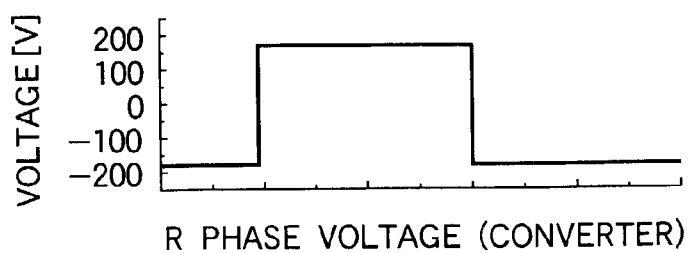
FIG. 4 is a view showing change of the phase voltage of the power converter and a form of the common mode current.
Figure 4B:
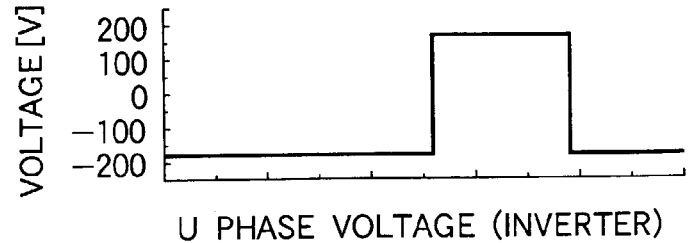
Figure 4C:
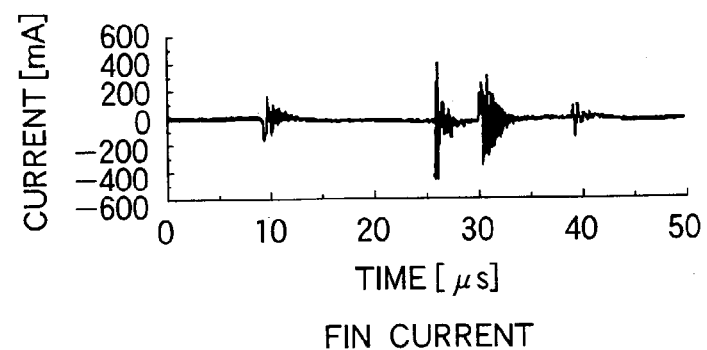

Hereinafter, how the frequency component generated from the power converter is propagated as the common mode current is examined. FIG. 4 shows change of the phase voltage of the power converter 3 and a form of the common mode current flowing into the cooling fin 34. FIG. 4A shows the change of the R phase voltage of the converter 31, FIG. 4B shows the change of the U phase voltage of the inverter 33, and FIG. 4C shows the common mode current flowing into the cooling fin 34. It is found from the figures that the flow of the common mode current is triggered by the potential change caused by the switching operation, and attenuates in about 5 microseconds.

Figure 5A:
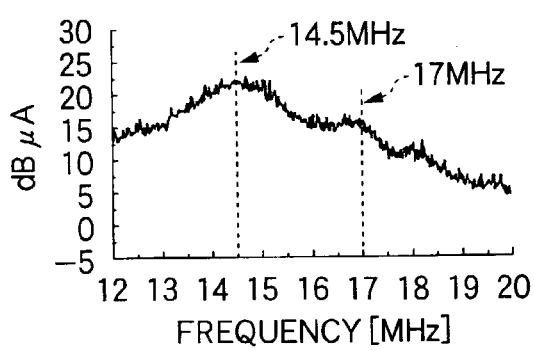
FIG. 5 is a view showing the FFT analysis results of the vibration component of the common mode current in FIG. 4.
Figure 5B:
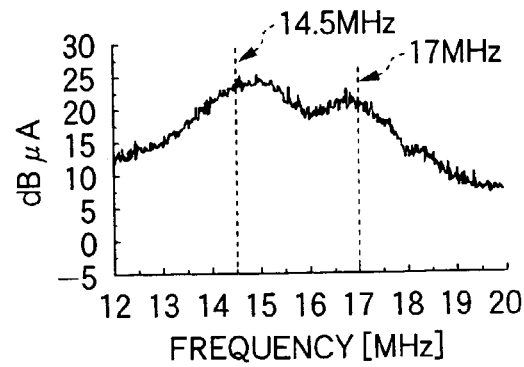

FIG. 5 is a view showing the FFT analysis results of the vibration component of the common mode current flowing into the cooling fin 34. FIG. 5A shows the result at the converter 31 side, and FIG. 5B shows the result at the inverter side. It is seen from the figures that the common mode current has the resonance frequency of 14.5 MHz in the converter 31 and 17 MHz in the inverter 33.

It is found from these analysis results that the high frequency component of the voltage variation caused by the switching operation of the power converter is the excitation source of the common mode current, and has a predetermined resonance frequency. Therefore, the common mode noise can be reduced by damping the resonance. Moreover, this resonance frequency corresponds with the resonance frequency obtained from a circuit model propagating from the power converter to the ground via the frame of the motor.

Also, it is found from the examination of the high frequency vibration caused by the micro-surge generated between the power converter 3 and motor 4, and the high frequency vibration caused by the micro-surge generated between the power converter 3 and AC reactor 2, that each vibration is the excitation source of the common mode current and has the predetermined resonance frequency. It is possible to reduce the common mode noise due to the voltage variation by properly setting the damping impedance.

Since the resonance circuit is a simple series resonance circuit, the resistor is good for the damping impedance element. Moreover, the resistance value of the resistor is easily obtained by a frequency analysis of the common mode current flowing through the position at which it will be inserted, for example, between the frame of the motor 4 and the ground. Typically, the resonance can be damped by inserting the resistor having the predetermined resistance value or more.

In FIG. 1, although the damping impedance elements 6, 7, and 8 are inserted at three places: between the frame of the motor 4 and the ground 5, between the cooling fin 34 of the power converter 3 and the ground 5, and between the frame of the AC reactor 2 and the ground 5, it is not essential to insert them at the three places. For example, in the system as shown in FIG. 1, the common mode noise can be restrained only by inserting the damping impedance 6 between the frame of the motor 4 and the ground 5. Moreover, the AC reactor 2 at the input side of the power converter 3 is not essential, or omissible. Further, in some cases including the case where the system is used as an uninterruptible power supply, loads such as the motor drive unit 4 are not necessarily connected directly to the power converter 3.

While it is possible to restrain the normal mode noise by inserting the noise filter into the DC line between the converter and inverter, it is also possible to reduce the normal mode noise by forming the power converter 3 using the multi-layer board and arranging the DC main circuit conductors 300$n$, 300$p$ properly between the converter 31 and inverter 33.

When the self-inductance of the conductor 300$p$ is expressed as $Ls1$, self-inductance of the conductor 300$n$ $Ls2$, mutual inductance $M$, effective inductance $Leff$, and current flowing through the conductor 300$p$ $i1$, the differential mode voltage $\Delta V$ between the DC main circuit conductors 300$p$ and 300$n$ is given as follows:

$$\Delta V=(Ls1+Ls2-2M)di1/dt=Leff \cdot di1/dt$$

As the voltage $\Delta V$ is reduced by decreasing the effective inductance $Leff$, or increasing the mutual inductance $M$, it is effective enough for decreasing the $\Delta V$ to arrange the series main-circuit conductors 300$p$, 300$n$ such that the mutual inductance $M$ becomes large. That is, when the power converter 3 is formed using the multi-layer circuit board, it is effective enough to arrange the series main-circuit conductors 300$p$, 300$n$ in the position where the different layers are substantially overlapped.

When such circuit board is used, since the normal mode noise is suppressed, the common-mode-current flow into the ground layer of the circuit board is achievable and thus the measures to the common mode noise can be easily taken by inserting the damping impedance elements. In addition, since the normal mode current is closed within wired area, electromagnetic radiation may be reduced. Further, as it is unnecessary to install the noise filter on the circuit board, a simpler apparatus configuration is obtained.

Figure 6A:
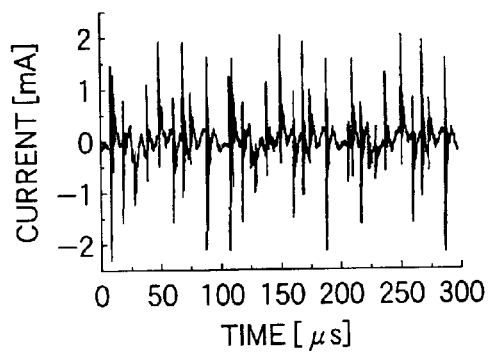
FIG. 6 is a view showing an example of respective detection results of the common mode current with and without inserting the damping impedance elements.
Figure 6B:
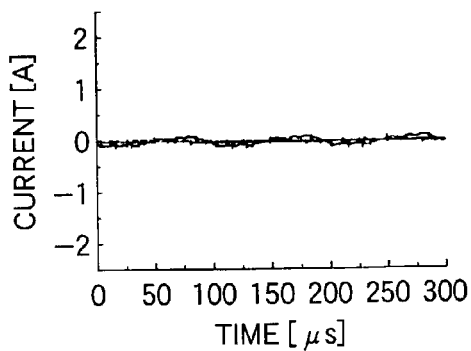

FIG. 6 is a view showing the detection results of the common mode current with and without inserting the damping impedance elements. FIG. 6A is a case without inserting the damping impedance elements, and FIG. 6B is a case with inserting them. FIG. 6B shows both of the case using only the resistor as the damping impedance element and the case using a series circuit of the resistor and capacitor, and there is no difference observed in each case in damping effect.

Figure 7A:
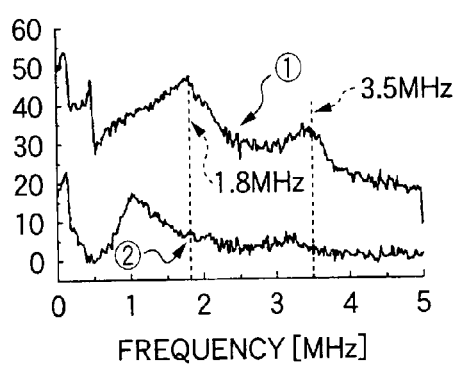
FIG. 7 is a view showing the FFT analysis results of the vibration component of the detected current in FIG. 6.
Figure 7B:
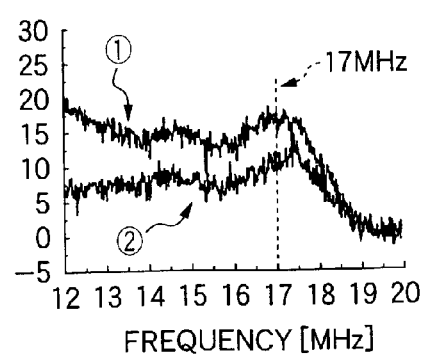

FIG. 7 shows FFT analysis results of the vibration component of the detected current in FIG. 6, where (1) is the case without inserting the damping impedance elements, and (2) is the case with inserting them.

As described hereinbefore, the common mode current, flowing from the elements constituting the system into the ground, contains the resonance spectra of which excitation source is the voltage variation caused by the switching operation of the power converter 3, resonance spectra of which excitation source is the micro-surge generated between the power converter 3 and motor 4, and resonance spectra of which excitation source is the micro-surge generated between the power converter 3 and AC reactor 2. Then, the resonance current having such frequency component flows not only into the ground via the floating capacitance, but also into the AC power supply 1 via the power line, causing the EMI noise.

It is effective enough for suppressing this noise to insert the noise filter for eliminating the frequency component between the power supply 1 and AC reactor 2, or between the AC reactor 2 and power converter 3, or between the power supply 1 and power converter 3 when the AC reactor 2 is omitted. The characteristic of the inserted noise filter is set such that at least the resonance spectra component of which excitation source is the voltage variation caused by the switching operation of the power converter 3, is eliminated. In addition, it may be set such that at least one of the resonance spectra component of which excitation source is the micro-surge generated between the power converter 3 and motor 4, and the resonance spectra component of which excitation source is the micro-surge generated between the power converter 3 and AC reactor 2, is eliminated.

While the noise filter is effectively applied to the system with the damping impedance elements inserted, it may be also applied to the system without the damping impedance elements inserted. When only the effect on the power supply 1 must be eliminated, advantages can be obtained fully even in such case.

As shown clearly from the description, according to the invention, it is possible to surely reduce the EMI noise in the system using the operational power converter with the switching control in a simple configuration.

What is claimed is:

1. A system using a power converter with switching operation, having:
   damping impedance elements inserted between one or a plurality of elements constituting the system and ground,
   wherein paths between the elements constituting the system and the ground are kept insulated except that the damping impedance elements are inserted
   wherein the damping impedance elements are structured to restrain substantially all of resonance current flowing from a series resonance circuit having resonance spectra,
   an excitation source for resonance current being voltage variation caused by the switching operation of the power converter.

2. The system according to claim 1 having:
   a load driven by the power converter,
   wherein the damping impedance elements are inserted between a frame of the load and the ground.

3. The system according to claim 2,
   wherein the damping impedance elements are set to restrain the resonance current flowing from the series resonance circuit having the resonance spectra of which excitation source is the voltage valuation caused by the switching operation of the power converter and the resonance spectra of which excitation source is a micro-surge generated between the power converter and the load.

4. The system according to claim 3
   wherein the damping impedance elements are resistors.

5. The system according to claim 2 having:
an AC reactor connected between an input terminal of the power converter and a power supply,
wherein the damping impedance elements are inserted between the frame of the AC reactor and the ground.

6. The system according to claim 5,
wherein the damping impedance elements are set to restrain the resonance current flowing from the series resonance circuit having the resonance spectra of which excitation source is the voltage valuation caused by the switching operation of the power converter, and at least one of the resonance spectra of which excitation source is a first micro-surge generated between the power converter and the load and the resonance spectra of which excitation source is a second micro-surge generated between the power converter and the AC reactor.

7. The system according to claim 6,
wherein the damping impedance elements are resistors.

8. The system according to claim 5,
wherein the damping impedance elements are resistors.

9. The system according to claim 2
wherein the damping impedance elements are resistors.

10. The system according to claim 1 having:
an AC reactor connected between an input terminal of the power converter and a power supply,
wherein the damping impedance elements are inserted between a frame of the AC reactor and the ground.

11. The system according to claim 10,
wherein the damping impedance elements are set to restrain the resonance current flowing from the series resonance circuit having the resonance spectra of which excitation source is the voltage valuation caused by the switching operation of the power converter, and at least one of the resonance spectra of which excitation source is a first micro-surge generated between the power converter and the load and the resonance spectra of which excitation source is a second micro-surge generated between the power converter and the AC reactor.

12. The system according to claim 11,
wherein the damping impedance elements are resistors.

13. The system according to claim 10
wherein the damping impedance elements are resistors.

14. The system according to claims 1,
wherein the damping impedance elements are resistors.

15. The system according to claim 1 having:
a load driven by the power converter,
wherein the damping impedance elements are inserted between a frame of the load and the ground.

16. The system according to claim 15,
wherein the damping impedance elements are set to restrain the resonance current flowing from the series resonance circuit having the resonance spectra of which excitation source is the voltage valuation caused by the switching operation of the power converter and the resonance spectra of which excitation source is a micro-surge generated between the power converter and the load.

17. The system according to claim 16
wherein the damping impedance elements are resistors.

18. The system according to claim 15 having:
an AC reactor connected between an input terminal of the power converter and a power supply,
wherein the damping impedance elements are inserted between the frame of the AC reactor and the ground.

19. The system according to claim 18,
wherein the damping impedance elements are set to restrain the resonance current flowing from the series resonance circuit having the resonance spectra of which excitation source is the voltage valuation caused by the switching operation of the power converter, and at least one of the resonance spectra of which excitation source is a first micro-surge generated between the power converter and the load and the resonance spectra of which excitation source is a second micro-surge generated between the power converter and the AC reactor.

20. The system according to claim 19,
wherein the damping impedance elements are resistors.

21. The system according to claim 18,
wherein the damping impedance elements are resistors.

22. The system according to claim 15
wherein the damping impedance elements are resistors.

23. The system according to claim 1 having:
an AC reactor connected between an input terminal of the power converter and a power supply,
wherein the damping impedance elements are inserted between a frame of the AC reactor and the ground.

24. The system according to claim 23,
wherein the damping impedance elements are set to restrain the resonance current flowing from the series resonance circuit having the resonance spectra of which excitation source is the voltage valuation caused by the switching operation of the power converter, and at least one of the resonance spectra of which excitation source is a first micro-surge generated between the power converter and the load and the resonance spectra of which excitation source is a second micro-surge generated between the power converter and the AC reactor.

25. The system according to claim 24,
wherein the damping impedance elements are resistors.

26. The system according to claim 23,
wherein the damping impedance elements are resistors.

27. The system according to claim 1,
wherein the damping impedance elements are resistors.

* * * * *